United States Patent [19]

Byren

[11] Patent Number: 4,798,462
[45] Date of Patent: Jan. 17, 1989

[54] AUTO-BORESIGHT TECHNIQUE FOR SELF-ALIGNING PHASE CONJUGATE LASER

[75] Inventor: Robert W. Byren, Hermosa Beach, Calif.

[73] Assignee: Hughes Aircraft Company, Los Angeles, Calif.

[21] Appl. No.: 811,793

[22] Filed: Dec. 20, 1985

[51] Int. Cl.[4] .......................................... G01B 11/26
[52] U.S. Cl. .................................. 356/152; 356/141; 356/153
[58] Field of Search ...................... 356/152, 153, 141; 89/41.06; 244/3.13

[56] References Cited

U.S. PATENT DOCUMENTS

| | | | |
|---|---|---|---|
| 3,709,608 | 1/1973 | Degnan et al. | 356/152 |
| 4,005,935 | 2/1977 | Wang | 356/5 |
| 4,146,329 | 3/1979 | King et al. | 356/152 |
| 4,155,096 | 5/1979 | Thomas et al. | 356/152 |
| 4,314,276 | 2/1982 | Woolfson | 356/152 |
| 4,346,994 | 8/1982 | Cruz | 356/152 |
| 4,386,848 | 6/1983 | Clendenin et al. | 356/152 |
| 4,395,121 | 7/1983 | Nory et al. | 356/152 |
| 4,587,622 | 5/1986 | Herzog | 356/152 |

Primary Examiner—Stephen C. Buczinski
Assistant Examiner—Linda J. Wallace
Attorney, Agent, or Firm—Ronald L. Taylor; W. J. Streeter; A. W. Karambelas

[57] ABSTRACT

A method and apparatus are disclosed for providing a self-aligning phase conjugate laser beam that is automatically boresighted with an active or passive tracking sensor. A single-transverse-mode laser oscillator 12 and a tracking sensor 14 are mounted on opposite sides of an output coupling beamsplitter 15, all attached to a stabilized platform 13 which is part of the inner gimbal of a pointing and tracking system. A multipass laser amplifier 21 with a phase conjugation mirror 22 and an optional nonlinear frequency-conversion device 20 are located off the inner gimbal. The inner gimbal allows rotation of the stabilized platform about an elevation axis 16, and an outer gimbal or pedestal mount permits rotation about an azimuthal axis 17. The phase conjugation mirror 22 compensates the beam for the effects of optical aberrations caused by thermally induced changes in the amplifier medium and the nonlinear medium (if used) and also compensates the beam for angular tilt and jitter in the beam line of sight due to structural flexibility and motion of the stabilized platform. Part of the oscillator output passes through the beamsplitter to the tracking sensor to mark the far-field location of the amplified output beam. The tracking sensor also views a target image after it is reflected by the beamsplitter. The tracking system measures the angular displacement between the target aimpoint and the locus of the output beam as marked by the oscillator and generates tracking error signals which are used to close a servomechanical feedback loop around the gimbal orientation apparatus. Pointing errors resulting from misalignment of the oscillator, the tracking sensor, and the beamsplitter are compensated by this technique.

7 Claims, 1 Drawing Sheet

AUTO-BORESIGHT TECHNIQUE FOR SELF-ALIGNING PHASE CONJUGATE LASER

BACKGROUND OF THE INVENTION

1. Cross-Reference to a Related Patent Application

The present patent application is related to a patent application, Ser. No. 810,808 entitled "Self-Aligning Phase Conjugate Laser," by Robert W. Byren and David A. Rockwell, filed on Dec. 19, 1985, and also assigned to the Hughes Aircraft Company.

2. Field of the Invention

The present invention relates to high-energy lasers used with pointing and tracking systems. More particularly, the present invention relates to methods for aligning the reference beam of a self-aligning phase conjugate laser with an active or passive tracking sensor.

3. Background Information

Many applications of laser systems demand precise control of the direction and wavefront profile of the laser beam. A wavefront is a three-dimensional surface of constant phase, at right angles everywhere to a family of rays. Typical aberrations in the profile of the wavefront include ones that alter the phase, focus, or astigmatic characteristics of the beam. Control of these distortions and the line of sight of the beam are of paramount importance in many applications involving long-distance communications, surveying, target ranging, the guidance of weapons systems, and the delivery of laser power to a remote location.

Laser pointing and tracking systems that employ off-gimbal laser devices in conjunction with gimballed tracking sensors are susceptible to pointing errors in the line of sight resulting from (1) wander in the laser beam due to thermal refractive effects and optical bench flexure in the laser itself, (2) static flexure and dynamic motion caused by thermal stresses and vibrations, respectively, and (3) angular wander of the line of sight due to bearing runout and nonorthogonality of the gimbal axes. "Wander" in a laser beam refers to changes in position of the centroid of a laser beam profile. Bearing "runout" refers to several related phenomena which have to do with the fit of the bearing race or races to a rotating shaft; for example, radial runout refers to the radial free play of the shaft in the bearing race or races, which allows the axis of the shaft to translate a certain amount parallel to itself, or to deviate from perpendicularity in its orientation with respect to the plane of the bearing. Previous laser pointing and tracking systems have attempted to control laser beam wander through good thermal management and proper structural design, through the use of folding elements such as corner cubes and roof prisms that make the alignment insensitive to changes in their positions, and more recently through the utilization of phase conjugation of the beam.

The use of phase conjugation techniques to correct laser beam wavefront distortion is known in the art and is used in order to take advantage of the benefits that result from its incorporation in laser systems. In U.S. Pat. No. 4,005,935, for example, Wang discloses a method and apparatus for providing a phase-compensated optical beam directed at a remotely located target. The effects of phase perturbations along the path to the target are substantially cancelled, and near diffraction-limited convergence of the beam on the target is obtained.

In U.S. Pat. No. 4,321,550, Evtuhov discloses a phase conjugation apparatus that corrects for optical distortion in high-power laser systems, and minimizes optical components. His system for phase conjugate correction is particularly suitable for use with an inertial confinement nuclear fusion system.

In U.S. Pat. No. 4,233,571, Wang and Yariv disclose a laser that self-corrects for distortions introduced into the laser output beam wavefronts by aberrations and time-varying phenomena internal to the laser, such as vibrations of the cavity reflecting surfaces, warping of the reflecting surfaces through heating, misalignment of the reflecting surfaces, aberrations in the lasing medium, and turbulence in the lasing medium (if the medium is not a solid). The self-correction of the effects due to these causes allows higher system efficiency and performance of the system at its diffraction limit, i.e., at its optimum focusing capability.

Giuliano, in U.S. Pat. No. 4,429,393, discloses apparatus using phase conjugation at two different frequencies in a laser ring resonator for the purpose of providing a phase-compensated diffraction-limited output beam at either or both frequencies.

In U.S. Pat. No. 4,344,042, Hon discloses apparatus for a self-regenerative laser oscillator-amplifier that employs intracavity phase conjugation to provide compensation for optical inhomogeneities in strongly pumped laser media without suffering efficiency losses, in order to achieve single-mode output with increased average and/or peak power.

None of these inventions, however, directly addresses the problems of misalignment of the output beam of a gimballed laser system due to compliance in the gimbal structure, imperfections or wear in the gimbal bearings, and nonorthogonalty of the gimbal axes. Nor does any of them address the problems of aligning the output laser beam with a tracking sensor.

Presently the problems of structural compliance and gimbal axis wander are controlled through good mechanical design and through the use of active input beam alignment systems. Typically the input beam alignment system is a closed-loop servomechanical system that uses a collimated laser source and receiver to sense the angular deviation in pointing the beam. The closed-loop servomechanical system is utilized in combination with a precision beam-steering mirror to provide vernier correction of the disturbed line of sight. Typically such input beam alignment systems can be quite complex, are limited in servo bandwidth because of reaction torque feedback, and are themselves prone to misalignment. In U.S. Pat. No. 4,326,800, Fitts discloses such a complex system for laser beam wavefront and line-of-sight error correction. Fitts uses a low-energy reference beam at the vertex of a primary mirror that is grated to diffract a low-energy holographic replica of the high-energy primary beam. A photodetector-based servo control system compares the line of sight of the reference beam to that of the low-energy replica and generates control signals which actuate a beam steering mirror to reposition the main beam. The servo control system also includes a wavefront sensor. The sensor analyzes the wavefront profile of the low-energy replica and generates control signals which actuate a deformable mirror to correct spurious wavefront aberrations.

The use of a passive, self-aligning phase conjugation laser system provides extremely wide-bandwidth compensation of all beam wander and misalignment effects, thus overcoming one of the primary disadvantages of active input beam alignment systems. The need for strict structural design constraints on the laser and gimbal are also eliminated. The beam from a self-aligning phase conjugate laser used with a pointing and tracking system is aligned with the stabilized platform on the inner gimbal, with compensation automatically provided for angular deviations and jitter in the beam line of sight caused by gimbal motion and structural compliance. The necessity for complex electromechanical servo systems, limited in response bandwidth and themselves prone to misalignment is eliminated, and in addition, use of the self-aligning phase conjugate laser relaxes the stiffness constraints on the laser and gimbal structures.

In the case of the self-aligning phase conjugate laser, there will be additional pointing errors resulting from misalignment of the output coupling beamsplitter and any additional optics not included in the phase conjugate leg of the beam path. Also, errors in alignment of the laser oscillator and tracking sensor mounted on the stabilized platform attached to the inner gimbal are not compensated by that method.

SUMMARY OF THE INVENTION

The auto-boresight technique for a self-aligning phase conjugate laser provides a simple means of aligning the reference beam with an active or passive tracking sensor. The auto-boresight technique provides a tracking implementation that corrects for oscillator, tracking sensor, and output coupling optics misalignment in a shared-aperture system. By including the output coupling beamsplitter in the optical path of the tracking sensor, this technique compensates pointing errors that would result from misalignment of the beamsplitter. By feeding part of the oscillator beam to the tracker to mark the far-field location of the output beam, this technique also compensates pointing errors that would result from misalignment of the laser oscillator. Automatic boresighting is accomplished by comparing the locations of the oscillator beam and the target image as viewed by the tracking sensor. The angular displacement between the two is used to generate tracking error signals which serve to close a tracking servo loop around the gimbals. Initial boresighting and boresight retention requirements imposed on the laser oscillator, tracking sensor, and output beam coupling optics are relaxed through use of this technique, so that manufacturing costs are reduced and system maintainability and reliability are improved.

The tracking sensor is set up to sense and track two optical signals. The first optical signal is derived from the portion of the collimated oscillator beam that is initially transmitted through the beamsplitter. This reference beam is used to mark the location of the output beam in the far-field as viewed by the tracking sensor. The second optical signal is the tracking signal received from the actual target being tracked. This signal is the passive image of the target (derived from its own radiation or from the reflection of ambient radiation) or the return signal from active illumination of the target by a source of radiation. For the passive tracking application a dichroic beamsplitter may be used. For active tracking applications a quarter-wave plate may be used to allow sharing of the system exit aperture through polarization selection techniques with minimal signal loss.

Use of the auto-boresight technique in conjunction with a self-aligning phase conjugate laser pointing and tracking system presents all of the advantages provided by the self-aligning phase conjugate laser, including (1) compensation of high-frequency jitter, (2) higher system reliability since additional servomechanisms are not required, (3) decreased system size and weight, and (4) lower development and production costs. In addition, the auto-boresight technique compensates for errors resulting from misalignment of the laser oscillator, tracking sensor, and output beam coupling optics. Because of the improved performance, maintainability, and reliability at reduced cost, the subject invention will find use in a wide variety of applications.

Accordingly, it is one object of the present invention to provide a high-power laser beam directed by a self-aligning phase conjugate pointing and tracking system that is compensated for errors resulting from misalignment of the laser oscillator.

It is another object of the present invention to provide a high-power laser beam directed by a self-aligning phase conjugate pointing and tracking system that is compensated for errors resulting from misalignment of the output beam coupling optics.

Yet another object of the present invention is to provide a high-power laser beam directed by a self-aligning phase conjugate pointing and tracking system that is compensated for errors resulting from misalignment of the tracking sensor.

An appreciation of other aims and objects, along with a more complete understanding of the present invention, may be achieved through the study of the following description of a preferred embodiment in addition to reference to the accompanying drawings.

BRIEF DESCRIPTION OF THE DRAWINGS

FIG. 2 is a drawing which illustrates the tracking process for the auto-boresight technique, wherein

DESCRIPTION OF A PREFERRED EMBODIMENT

Figure 1:
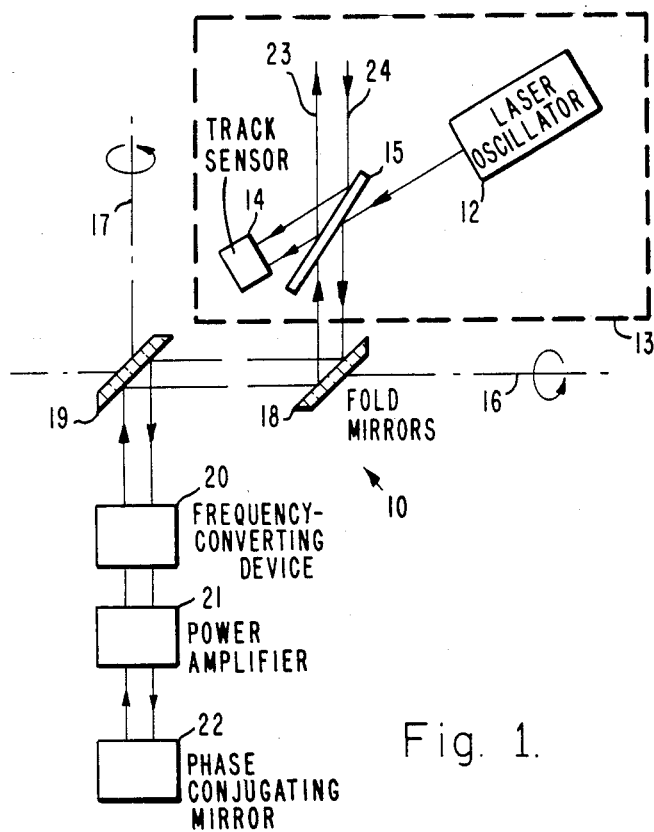
FIG. 1 is a schematic diagram showing the disposition of the various components of a preferred embodiment of the present invention.

Referring to FIG. 1, a preferred embodiment of the self-aligning phase conjugate laser for using the auto-boresight technique is shown, including a single-transverse-mode laser oscillator 12 mounted on a stabilized platform 13 which is part of the inner gimbal of a laser pointing and tracking system. The stabilized platform 13 serves as an optical bench on which are also mounted a tracking sensor 14 and a beamsplitter 15. The tracking sensor 14 is typically a television camera tube or forward-looking infrared (FLIR) sensor to provide a means of generating angular error signals to be used by servomechanical systems to point the stabilized platform 13 located on the inner gimbal of the pointing and tracking system. Mounting the single-mode laser oscillator 12, the track sensor 14, and the beamsplitter 15 on the same stabilized platform 13 which constitutes part of the inner gimbal allows the minimization of misalignment errors and jitter arising from structural compliance. The high-quality laser oscillator beam exits the inner gimbal stabilized platform 13 by reflection off the beamsplitter 15, which is a partially reflecting planar surface. After reflection off the beamsplitter 15 the high-quality single-transverse-mode laser oscillator beam passes through the structural framework comprising the gimbal axes 16 and 17 by reflections off two reflecting elements 18,19 and possibly some additional folding or relaying reflective elements (not shown). In one possible embodiment the reflecting elements 18 and 19 are "full-angle" reflecting elements, so named because they are disposed to give an amount of angular deviation of a reflected beam equal to the angle through which the element rotates. The reflecting element 18 is attached to the inner gimbal of the pointing and tracking system but is not part of the stabilized platform 13. The relecting element 19 is attached to an outer gimbal or pedestal mount, depending on the particular embodiment of the pointing and tracking system. There may also be additional reflecting elements to fold the optical path between reflecting elements 18 and 19. The reflecting elements can be chosen from a variety of conventional metallized or dielectric-coated mirrors or total-internal-reflection prisms designed to give maximum reflection over a range of wavelengths that includes the laser oscillator wavelength.

For some applications the low-power, high-quality laser oscillator beam will pass through a nonlinear frequency-converting device 20, but will not undergo frequency conversion in any significant amount because of the relatively low energy density in the beam. A laser power amplifier 21 comprising one or more segments (only one is shown) provides high gain at the oscillator wavelength. The wavefront of the laser beam emerging from the laser power amplifier 21 will be aberrated because of thermal lensing in the medium of the laser power amplifier and also in the medium of the nonlinear frequency-converting device 20 (if one is present). Aberrations may also be introduced by beam wander due to inhomogeneities in the power amplifier and frequency converter media. Furthermore, this same beam will be misaligned because of flexibility in the structure associated with the gimbals, will wander because of wear or inherent manufacturing imperfections in the bearings, and will wander in its line of sight because of nonorthogonality effects in the gimbal axes, such as the gimbal axes not being orthogonal to one another.

The phase conjugation mirror 22 generates a counterpropagating beam whose wavefront is the complex phase conjugate image of the incident wavefront. The phase conjugation mirror 22 can have different embodiments according to the mechanism whereby the nonlinear optical medium employed in it produces the phase conjugate image of the beam incident on it.

In one embodiment, the phase conjugation mirror 22 is a device based on the effect known as stimulated Brillouin scattering. Acoustic waves are set up in a nonlinear optical medium such as pressurized methane, tetrafluoromethane, or carbon disulfide. Any nonlinear optical medium which can be used for Brillouin scattering, whether it is a solid, liquid, or a gas, may be employed. The acoustic waves are produced through the process of electrostriction, which involves the interaction between the large electric field intensities present in the incident beam and the nonlinear scattering medium. The density of the scattering medium is periodically modulated by the electrostriction process, and acoustic waves are set up in response to the electric field. This process requires sufficient optical energy, such as can be furnished by a laser, because there is a power threshold below which stimulated Brillouin scattering will not occur. The acoustic waves which are generated in the scattering medium are produced in a time interval on the order of nanoseconds, which is extremely fast compared to the times associated with turbulence, thermal conduction, the propagation of mechanical disturbances, and many allied phenomena. Within the stimulated Brillouin scattering medium, the acoustic waves that are set up conform identically to the incident optical wavefronts, and act as reflecting surfaces for the wavefronts that impinge on the acoustic waves. Light waves that impinge on the acoustic waves are reflected so that their wavefronts become the complex phase conjugate image of the incident wavefronts. A frequency shift arising from the Doppler effect occurs in the retroreflection of light waves from the receding acoustic waves in the stimulated Brillouin scattering medium. This shift is on the order of 1 part in 100,000 and does not affect performance.

Therefore, when the phase-conjugated beam traverses the laser amplifier 21, the nonlinear frequency-converting device 20, and the gimbal optics 18 and 19, any optical aberrations and angular misalignments of the beam apparent after the first pass are perfectly compensated. After a second pass through the laser power amplifier 21, the beam has sufficient intensity to be efficiently converted by the nonlinear frequency-converting device 20 if one is used. The output beam 23, which is outcoupled through the beamsplitter 15, exhibits the optical quality and alignment accuracy of the on-gimbal laser oscillator 12 mounted on the stabilized platform 13, regardless of any line-of-sight jitter or optical distortion introduced by the amplifier medium, nonlinear medium, and the gimbal system.

If polarization-sensitive elements are employed, such as a nonlinear frequency converting crystal for 20, a means of polarization de-rotation is required to compensate the polarization rotation caused by the motion of the reflecting elements 18 and 19. A pair of quarter-wave plates or rhomboidal prisms, one located between the beamsplitter 12 and the reflecting element 18 and the other located between the reflecting element 19 and the nonlinear frequency converting device 20, will accomplish the required polarization de-rotation.

The laser oscillator 12 and laser power amplifier 21 employ either the same type of gain medium, or compatible types having the same wavelength, as a result of their gain curves overlapping at least in part. Possible gain media may include a crystal, such as ruby or neodymium-doped yttrium aluminum garnet (YAG); a doped glass, such as neodymium-doped glass; a semiconductor, such as gallium arsenide; a gas, such as carbon dioxide; a liquid containing a fluorescent dye, such as rhodamine 6G; or other gain media known in the art. The gain medium in either case (in laser oscillator 12 or in power amplifier 21) is excited by an appropriate conventional means not shown, such as the light from a xenon flashlamp, a high-voltage electrical discharge, a high-energy electron beam, or another laser. An example of the use of compatible gain media would be the use of a 1.06-micrometer laser diode such as indium gallium arsenide as the oscillator 12 and a 1.06-micrometer neodymium:YAG or neodymium:glass laser amplifier 21.

The phase conjugation mirror 22 may take on different forms in different embodiments of the self-aligning phase conjugate laser 10. Besides the process of stimulated Brillouin scattering used in the first embodiment described above, other embodiments may be envisioned in which use is made of the phenomena commonly referred to as degenerate four-wave mixing, three-wave mixing, and photon echo effects. All these phenomena are described in articles and books covering the topic of nonlinear optics, such as, for example, the third edition of the book entitled *Optical Electronics*, written by Amnon Yariv and published in 1985 by Holt, Rinehart, and Winston in New York; the article "Nonlinear Optical Phase Conjugation," by D.M. Pepper, in *The Laser Handbook*, volume 4, edited by M. Bass and M. Stitch and published by North-Holland in New York in 1985; and the book *Optical Phase Conjugation* by R. A. Fisher, published by Academic Press in New York in 1985. Embodiments of phase conjugation mirrors utilizing three-wave mixing, degenerate four-wave mixing, and photon echo effects are known in the art and are described in various U.S. Patents such as U.S. Pat. No. 4,321,550—Evtuhov and U.S. Pat. No. 4,233,571—Wang and Yariv.

The first embodiment of the phase conjugation mirror 22 is a stimulated Brillouin scattering device, in which an incident wavefront that has been deformed by some optical aberration sets up acoustic waves in a suitable medium such as pressurized methane, tetrafluoromethane, or carbon disulfide. The acoustic waves are produced by electrostriction, a process in which the very large electric field intensities in the incident laser beam interact with the medium. The density of the medium is periodically modulated by the electrostriction process in a time extremely small compared to that of any mechanism that may have caused the distorted wavefronts of the incident light waves. The periodic density variations associated with the acoustic waves serve as reflecting surfaces for the aberrated wavefronts impinging on the acoustic waves. The complex phase conjugate image of the incident optical wavefront is reflected, and when the reflected wave reencounters the aberration that initially caused the deformation, the distorted wave is corrected as it passes the aberration.

The second embodiment of the phase conjugation mirror 22 employs the process of degenerate four-wave mixing to accomplish the wavefront correction. Two pump waves, emitted by either two identical lasers having the same wavelength or one laser in combination with a beamsplitter arrangement, produce coherent optical beams which are incident on a nonlinear medium from opposite directions. A phase hologram is set up in the medium by the interaction of the two pump waves and an aberrated wavefront with the medium. The aberrated wavefront incident on the medium is reflected as the phase conjugate waveform. Alternatively, an appropriate absorbing or amplifying medium is used which results in amplitude holograms being established in the medium and this leads to the phase conjugation process.

The third embodiment makes use of the process of three-wave mixing, often referred to as parametric downconversion. The incident aberrated wavefronts strike a nonlinear medium, and in addition, an external laser emits waves of a pump frequency which is twice that of the aberrated waves and which are also made incident on the medium from the same direction. The interaction of the waves and the medium produces the phase conjugate waveform, which is propagated through the nonlinear medium. This waveform is then transmitted back along the initial optical path of the incident aberrated wavefront by conventional means.

Yet another embodiment utilizes the process of photon echoes to produce phase conjugate reflected wavefronts. This process is akin to stimulated Brillouin scattering, except that the nonlinear medium is different. In the photon echo process, an incident aberrated wavefront deforms the medium. A laser pulse emitted by an external laser that impinges on the same medium at a later time is reflected as the complex phase conjugate waveform of the aberrated incident waveform. This process is extremely fast, even faster than the process involving stimulated Brillouin scattering. The process takes place within several centimeters of the surface of the nonlinear medium on which the aberrated wavefronts are incident.

The nonlinear frequency-converting device 20 can take on different forms according to the exact physical mechanism employed, although most of them rely on the nonlinear optical properties of certain media. Two such mechanisms are frequency doubling, also known as second harmonic generation, and stimulated Raman scattering.

The explanation of frequency conversion effects in nonlinear optical media lies in the way a beam of light propagates through a dielectric medium. A material medium consists of atoms or molecules whose nuclei and associated electrons form electric dipoles. Electromagnetic radiation in the form of a light beam interacts with these dipoles and causes them to oscillate. These oscillating dipoles themselves act as sources of electromagnetic radiation. If the amplitude of vibration of the dipoles is small, the radiation they emit has the same frequency as that of the incident radiation. As the intensity of the incident radiation increases, however, nonlinear effects eventually come into play which produce harmonics of the frequency of oscillation of the dipoles. The second and strongest frequency harmonic is at twice the frequency of the incident radiation. Not all solids exhibit frequency doubling; the phenomenon is not observed for solids that have a center of symmetry in their structure. In crystals which do produce frequency-doubled light, dispersion causes the frequency-doubled light to travel at a different velocity than the light whose frequency is not doubled. Destructive interference effects result in periodic variations in the intensity of the frequency-doubled light through the crystal. If the speeds of propagation of the beams can be made equal, a more powerful frequency-doubled beam is obtained. A technique for speed equalization, also known as phase matching, can be achieved using birefringent crystals for which the dispersion is less than the birefringence. Crystals of ammonium dihydrogen phosphate (ADP) and potassium dideuterium phosphate (KD*P) belong to this group of materials and are commonly used for second harmonic generation in commercial laser systems, where efficiencies of 20 to 30 percent have been achieved. Several new materials present the possibility of higher conversion efficiency. Lithium niobate yields a high conversion efficiency but has an index of refraction which depends strongly on laser power. This effect is known as optical damage and in lithium niobate is known not to occur above 160 degrees Centigrade. Frequency doublers employing lithium niobate must be kept in an oven with an accurately controlled temperature for phase matching. Another material, barium sodium niobate, has an even higher frequency conversion efficiency and does not appear to suffer from optical damage.

Another effect that can be used in frequency conversion is stimulated Raman scattering. In the ordinary Raman effect a photon of an incident light beam is scattered by a molecule and emerges with a different wavelength. For a monochromatic beam, there will be more than one shifted spectral line, in general. If an emitted line has a wavelength longer than that of the incident beam, it is called a "Stokes line." An emitted spectral line with a wavelength shorter than that of the incident beam is called an "anti-Stokes line." The difference in energy between the emitted and incident photons is due to changes in vibrational, electronic, spin, and rotational levels of the molecule, with a decrease in energy corresponding to the Stokes line and an increase in energy corresponding to the anti-Stokes line. The scattered beams at particular wavelengths appear in well-defined cones about the direction of the incident beam. In stimulated Raman scattering the photons emitted in the ordinary Raman effect are made to stimulate further Raman emissions. With strong pumping of a Raman-active medium by a laser, gain can be achieved at the wavelengths corresponding to the Stokes and anti-Stokes spectral lines. This pumping can be used to set up oscillations at these wavelengths. Hydrogen, deuterium, and methane are some of the molecular gases which have been used, usually under pressure because the effect is enhanced with increased density of the gas.

Experimental results demonstrate that a passive phase conjugation mirror effectively compensates for laser beam wander. A Nd:YAG laser pulsed at 5 Hertz, a scanning prism to induce beam wander, and a simple phase conjugation mirror comprising a focusing lens and a cell containing pressurized methane were used to show that a root-mean-square beam wander as large as approximately 4 milliradians is reduced to the approximately 10-microradian residual beam wander of the original laser. Furthermore, this compensation capability of nearly three orders of magnitude (a factor of 1000, or ten raised to the third power) does not constitute a fundamental limit. Compensation for even greater beam wander was not attempted because the amount of compensation achieved is estimated to exceed the requirement for beam wander compensation that might be encountered in practical laser oscillator-amplifier systems of high average power. Results were also obtained showing that the phase conjugate mirror compensates for aberrations that might exist in the optical path. Using a poor-quality optical element in conjunction with a conventional mirror increased the beam divergence by a factor of three, but produced a negligible increase in beam divergence of less than 10 percent when used with the phase conjugate mirror.

The improved apparatus for the self-aligning phase conjugate laser in its preferred embodiment for use with the auto-boresight technique is shown in FIG. 1. The tracking sensor 14, typically a TV camera tube, is located on the opposite side of the beamsplitter 15 from the laser oscillator 12 so as to receive part of the output radiation from the oscillator. In addition, the tracking sensor receives radiation 24 coming from the target after it is reflected from the side of the beamsplitter facing the sensor. The stabilized platform 13 on which the oscillator, beamsplitter, and tracking sensor are mounted does not require the degree of rigidity which is needed when the auto-boresight technique is not used. Initial boresighting of the oscillator beam and tracking sensor is not required, either.

Figure 2A:
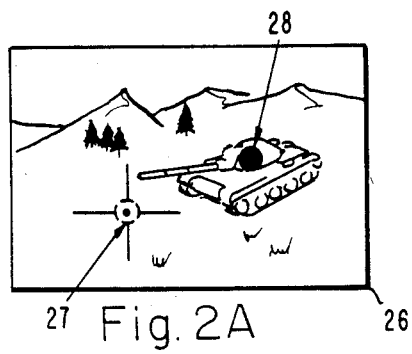
FIG. 2A shows the angular displacement between a target aimpoint 28 and the focus of the output beam 27.
Figure 2B:
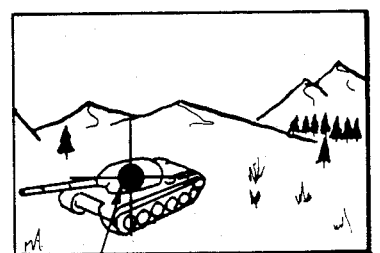
FIG. 2B shows the tracking sensor field of view after the tracking loop has been closed.

The tracking process for the auto-boresight technique is illustrated by FIG. 2. FIG. 2A shows the tracking sensor field of view 26 in which a target (here a tank) is located. The dashed circle and reticle pattern represent the locus of the output beam in the far field 27, which is marked by the return signal from the laser oscillator. The solid circle represents the selected target aimpoint 28. The tracker is designed to measure the angular displacement between the target aimpoint 28 and the locus of the output beam in the far field 27, and to generate tracking error signals which are used to close a tracking servo loop around the gimbal orientation machinery. FIG. 2B shows the tracking sensor field of view after the tracking loop has been closed and the tracking errors have been nulled. The only pointing errors that remain are those resulting from imperfect isolation of the inner gimbal from base motion and from imperfect tracking due to sensor noise and target motion. Errors that would have resulted from misalignment of the beamsplitter 15 are compensated by the symmetric reflection of the oscillator beam and the tracking signal off the same beamsplitter. Errors that would have resulted from misalignment of the laser oscillator 12 or the tracking sensor 14 are compensated by using the oscillator to mark the far-field location of the output beam as a tracing reference.

Although the present invention has been described in detail with reference to a particular preferred embodiment, persons having ordinary skill in the art will appreciate that various modifications and alterations may be made without departing from the spirit and scope of the invention.

What is claimed is:

1. A method for automatically boresighting a self-aligned phase conjugate laser having a laser oscillator, a laser amplifier, and a phase conjugation mirror in order to produce an automatically boresighted output beam including the steps of:

pointing a sensor mounted on a stabilized platform in the general direction of a target in order to develop an image of said target and locate a desired aimpoint on said target;

generating a reference laser beam using a laser oscillator mounted on said stabilized platform;

conveying a portion of said reference laser beam to said sensor in order to locate a position corresponding to a location of said output beam generally at said desired aimpoint;

calculating an angle subtended by said reference beam and said target; and adjusting the position of said platform in order to cause said angle to equal zero.

2. An automatic boresighting method for pointing a high energy laser weapon in the direction of a perceived, external reconnaissance radiation beam including the steps of:

sensing an external radiation beam by searching for and collecting said external radiation beam using a movable tracking sensor mounted on a stabilized platform;

directing a first portion of a reference laser beam from a high beam quality laser oscillator also mounted on said stabilized platform to said tracking sensor;

comparing the direction of said sensed external radiation beam as received by said tracking sensor to the direction of said first portion of said reference laser beam;

generating an error signal corresponding to an angular offset value equal to the difference between said directions of said external radiation beam and said reference laser beam;

using said error signal to actuate a platform steering means in order to move said platform to a position which causes said error signal to equal zero; and passing a second portion of said reference laser beam through a laser amplifier mounted independently from said stabilized platform and a phase conjugation mirror also mounted independently from said stabilized platform in order to produce a high energy, self-aligned output beam.

3. An automatically boresighted laser system for producing a high energy output beam comprising:

a pointing and tracking sensor mounted on a movable, stabilized gimbal;

a laser oscillator capable of emitting a reference laser beam, said laser oscillator being mounted on said movable, stabilized gimbal;

a beamsplitter mounted on said movable, stabilized gimbal for directing a first portion of said reference beam to said pointing and tracking sensor and a second portion of said reference beam to a directing means;

a laser amplifier mounted independently off said stabilized gimbal and disposed to receive said second portion of said reference beam from said directing means for amplifying said reference laser beam;

a phase conjugation mirror mounted independently off said stabilized gimbal and disposed to receive an amplified laser beam that has been passed through said laser amplifier for correcting aberrations in said second portion of said reference laser beam after said second portion of said reference laser beam passes through said laser amplifier;

said pointing and tracking sensor being positioned to receive said first portion of said reference laser beam together with radiation from a target in order to generate an error signal based upon an angular difference between the directions of said reference beam and said target; and said error signal being employed to drive a gimbal positioning means to align said output beam with said target.

4. Apparatus as claimed in claim 3 in which said pointing and tracking sensor is an imaging sensor.

5. Apparatus as claimed in claim 3 in which said pointing and tracking sensor is a quadrant array of photodetectors.

6. Apparatus as claimed in claim 3 which further includes a nonlinear wavelength converter disposed between said laser oscillator and said laser amplifier.

7. Apparatus as claimed in claim 3 which further includes a quarter wave plate disposed between said target and said beamsplitter.

* * * * *

UNITED STATES PATENT AND TRADEMARK OFFICE
CERTIFICATE OF CORRECTION

PATENT NO. : 4,798,462
DATED : January 17, 1989
INVENTOR(S) : Robert W. Byren

It is certified that error appears in the above-identified patent and that said Letters Patent is hereby corrected as shown below:

Column 10, line 22, delete "tracing" and insert therefor -- tracking --.

Signed and Sealed this

Twenty-sixth Day of March, 1991

Attest:

HARRY F. MANBECK, JR.

*Attesting Officer*  *Commissioner of Patents and Trademarks*